Dec. 4, 1923.

F. C. LE MESSURIER ET AL 1,476,451

CHAIN FASTENER

Filed May 12, 1923

INVENTOR:
Frank C. Le Messurier and
Frank E. Stall
BY Robt P Harris
ATTORNEY

Patented Dec. 4, 1923.

1,476,451

UNITED STATES PATENT OFFICE.

FRANK C. LE MESSURIER AND FRANK E. STAHL, OF TONAWANDA, NEW YORK, ASSIGNORS TO THE COLUMBUS McKINNON CHAIN CO., OF COLUMBUS, OHIO, A CORPORATION OF OHIO.

CHAIN FASTENER.

Application filed May 12, 1923. Serial No. 638,634.

*To all whom it may concern:*

Be it known that we, FRANK C. LE MESSURIER and FRANK E. STAHL, citizens of the United States, residing at Tonawanda, in the county of Erie and State of New York, have invented an Improvement in Chain Fasteners, of which the following description, in connection with the accompanying drawings, is a specification, like characters on the drawings representing like parts.

This invention relates to chain tighteners and fasteners, and the present device, although well adapted for various purposes, is designed more particularly for use upon non-skid tire chains as a rim chain fastener.

In securing non-skid chains to automobile tires, it is desirable that the rim chains be provided with fasteners which may be readily manipulated to tighten the chains about a tire and to secure the ends of the chains together, and that the fasteners be so constructed that they may be easily released by hand but will not become unfastened while in use.

Since it may be necessary at frequent intervals to apply non-skid chains to automobile tires and to remove them therefrom, it is important that the operations of securing the chains to the tires and removing them from the tires be as simple as possible, while at the same time it is essential that the securing means be strong enough to withstand the severe stresses to which it is subjected while in use, and that it be free from the possibility of becoming unfastened while in use.

Various types of chain fasteners have been proposed heretofore in an effort to meet the above requirements, but none of these fasteners are entirely satisfactory, and the present invention is directed to a chain fastener that is simple in construction, may be easily manipulated to secure a chain in place and to release the same, and which will not become unfastened while in use.

The accompanying drawing illustrates a good practical form of the invention, the details of which may be modified within the true scope thereof as defined by the claims.

Figure 1:
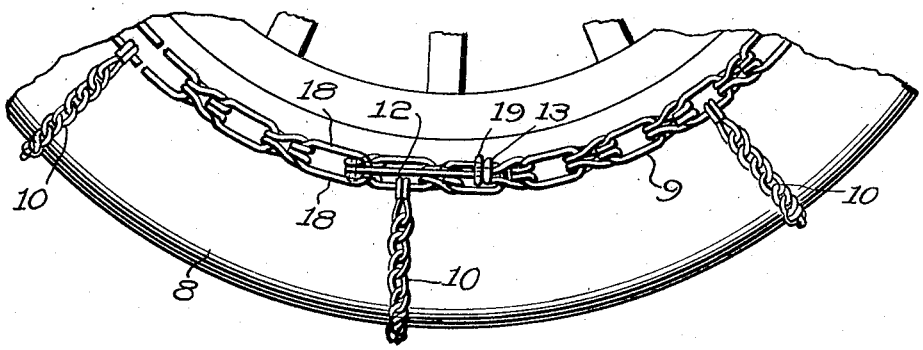
Fig. 1 is a side view of a portion of an automobile tire having a non-skid tire chain secured thereto by a chain fastener constructed in accordance with the present invention.

In Fig. 1 of the drawing a portion of an automobile tire 8 is shown as having a non-skid tire chain secured thereto and consisting of the rim chain 9 disposed at one side of the tire and the cross chains 10 extending across the tread of the tire from one rim chain to the other, and the ends of the chain 9 are shown as secured together by the lever 11 of the present chain fastener.

The lever 11 is shown as provided with an elongated shank 12 having a transversely extending head 13 at one end thereof and at the opposite end of the shank 12 is provided an offset portion 14, and the construction is such that a link receiving notch 15 is formed at the juncture of the shank 12 and offset portion 14. The head 13 preferably extends laterally in a direction substantially at right angles to the plane of the offset portion 14, and the lever 11 may conveniently be made of sheet metal having the configuration shown, and the head 13 may be twisted through an angle of approximately 90 degrees to cause the head to extend transversely to the plane of the combined shank and offset portion. The chain fastener of the present invention may be used as a fastener for practically any type of chain, and in the present case the chain 9 is shown as formed of elongated links 16 having a well known construction. The offset portion 14 of the lever 11 is adapted to be pivotally secured to the chain upon which the same is to be used, and in the present case the lever 11 is conveniently secured to the end link 16 by a pivot pin 17 which passes through the eyes formed at one end of the link 16, and through the offset portion 14, and this pivot pin may be secured in place by riveting its ends as shown.

Figure 2:
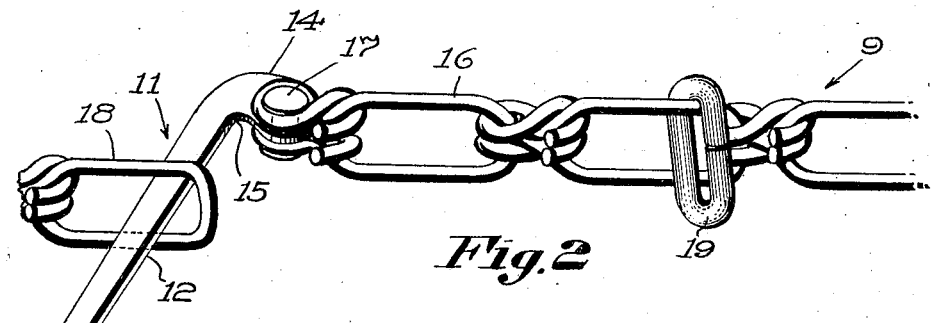
Fig. 2 is an enlarged perspective view of a chain fastener constructed in accordance with the present invention and shows the chain securing lever in the partly closed position.
Figure 3:
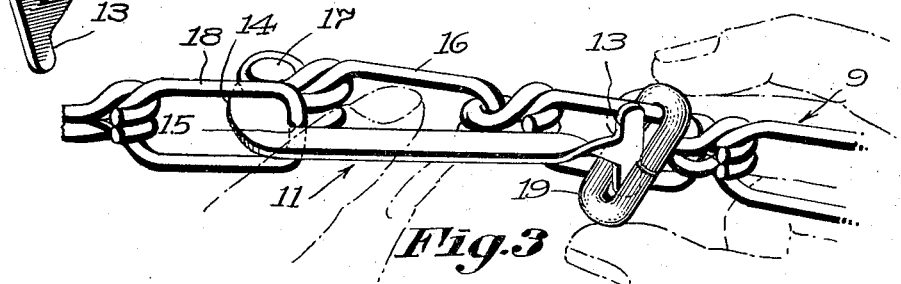
Fig. 3 is a view similar to Fig. 2, showing the lever in the closed position and held in this position by hand while the fastening means is being slipped by hand over the outer end of the lever.
Figure 4:
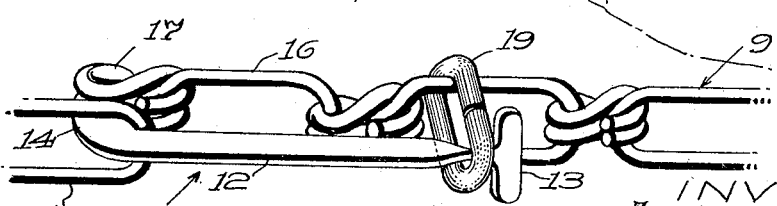
Fig. 4 is a perspective view showing the chain fastening means secured in its fastening position.

The construction of the lever 11 is such that its outer end may be inserted through a link 18, or other element, as shown in Fig. 2, and as this lever is swung forward about its pivot 17 to the position shown in Fig. 3, it will tighten the chain 9 as will be apparent; and in the present case the means for maintaining the lever 11 in the position shown in Fig. 3, consists of an elongated ring 19 which may be secured to a lateral side of a link of the chain 9, as best shown in Fig. 2. The construction of the ring 19 is preferably such that it may be slipped freely over the head 13 upon the outer end of the lever when the ring is turned to a position to bring its longitudinal axis substantially into the plane of the transversely extending head 13, but this ring will not pass over the head 13 when the longitudinal axis of the ring is disposed at substantially right angles to the head as shown in Fig. 4. This construction is important because it permits the ring 19 to be readily slipped over the head 13 when the parts are in the position shown in Fig. 3 to engage the shank of the lever or to release the lever, but the ring will not pass over the head 13 when the parts are in the position shown in Fig. 4. It should be noted that as long as tension is exerted upon the chain 9 the link 18 which lies to one side of the lever pivot 17, tends to swing the lever 11 outwardly from the chain 9 to which it is secured, and this serves to hold the shank 12 at one end of the elongated ring 19 as will be apparent from Fig. 4, and while the parts are maintained in this position it is impossible for the ring to escape from the end of the lever and releases the same.

From the foregoing description when read in connection with the drawing it will be seen that the construction of the present chain fastener is such that the lever 11 serves to tighten a chain as the lever is moved to its chain-securing position, and that the lever upon being swung to the position shown in Fig. 3 may be readily secured in this position in such a manner that all danger of the parts being accidently released is avoided. As above pointed out the tension of the chain 9 serves to hold the shank of the lever 11 at one end of the elongated ring 19, which prevents the link from escaping from the outer end of this lever, and when the present chain fastener is used to connect the ends of a rim chain of a non-skid tire, the parts preferably are positioned as shown in Fig. 1, wherein it will be seen that should the chain 9 become somewhat slack, gravity will serve to move the lever 11 downwardly slightly to maintain the shank 12 at one end of the elongated ring to avoid danger of the link escaping from the end of the lever.

It should be noted that the lever 11 normally extends centrally along the chain 9, and since the elongated ring 19 is looped about a laterally disposed side of a link it will extend in an inclined direction from the link to the shank as will be apparent from Fig. 4, and if the tension of the chain is relieved sufficiently to permit the lever 11 to move downwardly slightly by gravity relative to the chain, then the fact that one end of the ring is looped about a lateral side of a link will help to maintain the opposite end of the ring in engagement with the shank 12, which is desired to prevent the ring from slipping over the head 13. It will be understood that the rim chain (not shown) but on the opposite side of the tire 8 may be provided with a similar chain fastener.

What is claimed is:

1. In combination with a chain, a chain tightener and fastener comprising, a lever consisting of an elongated shank adapted to be inserted through a link and having a transversely extending head at one end and an offset portion at its other end forming a link receiving notch at the juncture of the shank and offset portion, means for securing the offset portion of the lever to a chain, and an elongated ring having one end looped about one of the lateral sides of a link of the chain with its opposite end extending outwardly from the link and free to swing transversely to the direction in which the chain extends and adapted to be slipped over said head and engaged with the lever shank upon swinging the ring so that its longitudinal axis extends in the direction in which the head extends.

2. In combination with a chain, a chain tightener and fastener comprising, a lever consisting of an elongated shank adapted to be inserted through a link and having a transversely extending head at one end and an offset portion at its other end forming a link receiving notch at the juncture of the shank and offset portion, means for securing the offset portion of the lever to a chain, and an elongated lever securing ring having one end looped about one of the lateral sides of a link of the chain with its opposite end extending outwardly and free to swing transversely to the direction in which the chain extends and constructed to clear said head only upon the longitudinal axis of the ring being brought to a position to extend in the general transverse direction of said head.

3. In combination with a chain, a chain tightener and fastener comprising, a lever consisting of an elongated shank adapted to be inserted through a link and having a transversely extending head at one end and an offset portion at its other end forming a link receiving notch at the juncture of the shank and offset portion, means for securing the offset portion of the lever to a chain, and an elongated lever holding means secured to one of the lateral sides of a link of the chain and free to swing transversely to the direction in which the chain extends and constructed to be slipped over said head into locking engagement with the lever shank upon swinging of the holding means to a position in which its longitudinal axis extends in the general transverse direction of said head.

4. In combination with a chain, a chain tightener and fastener comprising, a lever consisting of an elongated shank adapted to be inserted through a link and having a head at one end and an offset portion at its other end forming a link receiving notch at the juncture of the shank and offset portion, means for securing the offset portion of the lever to a chain, and an elongated ring for securing the lever in place having one end looped about one of the lateral sides of a link of the chain with its opposite end extending outwardly from the link and free to swing transversely to the direction in which the chain extends and constructed to clear said head only when the ring is swung to a position in which it extends transversely of the spaced sides of the link.

5. In combination with a chain, a chain tightener and fastener comprising, a lever consisting of an elongated shank having a head at one end and an offset portion at its other end and a link receiving notch at the juncture of the shank and offset portion, means for securing the lever pivotally to the chain to extend centrally along the latter, and an elongated lever fastening ring looped about one of the lateral sides of a link of the chain and adapted to be slipped over said head and about said shank to extend in an inclined direction from a laterally disposed side of a link to the centrally disposed side of a link with one end of the elongated ring lever engaging a lateral side of a link and the other end of the ring embracing the lever.

In testimony whereof, we have signed our names to this specification.

FRANK C. LE MESSURIER.
FRANK E. STAHL.